(12) United States Patent
Anderson et al.

(10) Patent No.: US 6,927,677 B2
(45) Date of Patent: Aug. 9, 2005

(54) BLIND SPOT DETECTOR SYSTEM

(76) Inventors: Darryll Anderson, 15114 Crenshaw Blvd., Gardena, CA (US) 90249; Andrei Cernasov, 34 Edward Dr., Ringwood, NJ (US) 07456

( * ) Notice: Subject to any disclaimer, the term of this patent is extended or adjusted under 35 U.S.C. 154(b) by 343 days.

(21) Appl. No.: 10/387,409

(22) Filed: Mar. 14, 2003

(65) Prior Publication Data

US 2004/0178892 A1 Sep. 16, 2004

(51) Int. Cl.$^7$ .............................................. B60Q 1/00
(52) U.S. Cl. ..................... 340/435; 340/436; 340/903; 340/901; 701/36; 701/45; 280/727
(58) Field of Search ............................... 340/435, 901, 340/903, 436, 438, 425.5, 555, 556, 933, 942; 280/727, 734; 701/36, 46; 367/101, 107

(56) References Cited

U.S. PATENT DOCUMENTS

| | | | |
|---|---|---|---|
| 4,694,295 A | * 9/1987 | Miller et al. | ................. 340/903 |
| 4,872,051 A | 10/1989 | Dye | |
| 5,173,881 A | 12/1992 | Sindle | |
| 5,325,096 A | 6/1994 | Paskett | |
| 5,463,384 A | 10/1995 | Juds | |
| 5,574,426 A | 11/1996 | Shisgal et al. | |
| 5,719,580 A | * 2/1998 | Core | ........................... 342/100 |
| 5,734,336 A | 3/1998 | Smithline | |
| 5,929,786 A | 7/1999 | Schofield et al. | |
| 5,982,278 A | 11/1999 | Cuvelier | |
| 6,184,782 B1 | 2/2001 | Oda et al. | |
| 6,193,380 B1 | * 2/2001 | Jacobs | ......................... 340/904 |
| 6,198,409 B1 | * 3/2001 | Schofield et al. | ........... 340/903 |
| 6,388,566 B1 | 5/2002 | Perio et al. | |
| 6,734,807 B2 | * 5/2004 | King | .......................... 340/903 |

FOREIGN PATENT DOCUMENTS

| | | |
|---|---|---|
| DE | 3943431 | 7/1991 |
| FR | 2698449 | 5/1994 |
| WO | WO 95/25322 | 9/1995 |

* cited by examiner

Primary Examiner—Jeffery Hofsass
Assistant Examiner—Daniel Previl
(74) Attorney, Agent, or Firm—Richard C. Litman

(57) ABSTRACT

A blind spot detector system adapted to the exterior of a vehicle comprising at least one infrared light emitting diode (LED), an infrared photodetector and demodulator, and a microcontroller. The output power of the infrared transmitter is linearly modulated, enabling the blind spot detector to determine the proximity of the detected object. Furthermore, the transmitter output is frequency modulated to screen out random infrared radiation that might adversely affect the operation of the infrared photodetector. The system is calibrated to the position of the attached vehicle by linearly increasing the output power of the transmitter until the rear quadrant of the vehicle is detected when the transmitter is outputting power at a pre-determined calibration level. During normal operation, an object detected while the transmitted power is greater than a predetermined lower threshold and less than the calibration level will activate a LED indicator on the system housing.

15 Claims, 13 Drawing Sheets

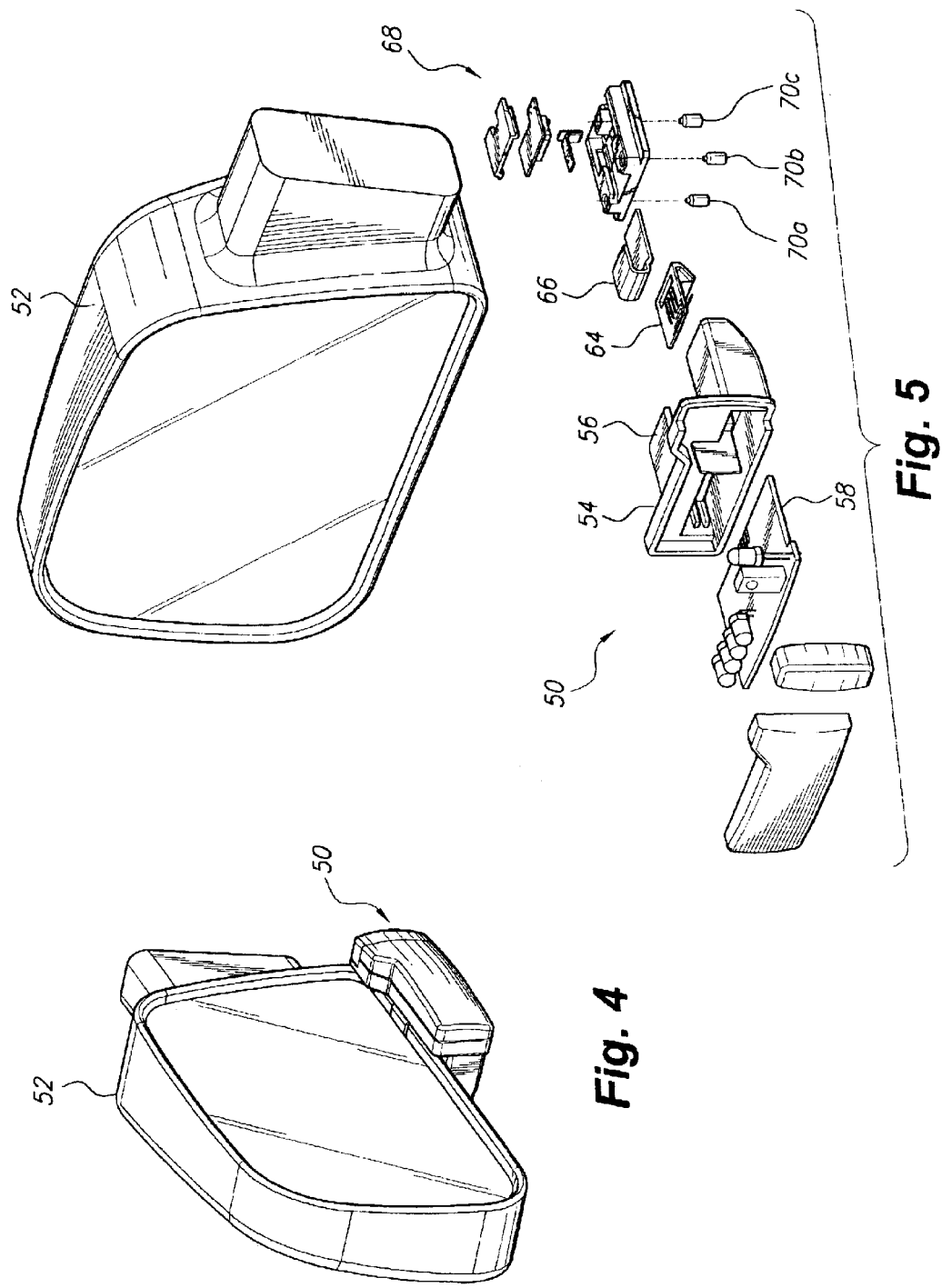

BLIND SPOT DETECTOR SYSTEM

BACKGROUND OF THE INVENTION

1. Field of the Invention

The present invention relates to vehicle safety devices, and more specifically, relates to a system for detecting objects in a vehicle's "blind spot".

2. Description of the Related Art

A common problem to the operators of motor vehicles is the difficulty in detecting other vehicles or objects in the "blind spots" of the vehicle's operator. A common blind spot is to the rear left of the operator's seat, and a right-side blind spot extends outward from the rear right quadrant of the vehicle. Both of these blind spots are the source of numerous accidents when the driver makes a left or right turn or a left or right lane change.

Vehicle manufacturers have sought to overcome these blind spots through the use of left and right side-view mirrors, however, several limitations have prevented mirrors from adequately resolving the problem. First, the mirrors do not necessarily reflect the true position of the object in the mirror. Mirror manufacturers have attempted to give the driver a wider angle of view at the price of having a smaller reflection, giving the operator a false sense of distance. Second, nighttime use and adverse weather conditions limit the effectiveness of externally mounted mirrors. Third, a vehicle may have several alternate drivers, each requiring different physical positions of the mirror. However, a driver may neglect to adjust the mirror after taking control of the vehicle thus forsaking any benefit the mirror may provide. Alternatives to mirrors for detecting the presence of vehicles or other objects in the driver's blind spot include both active and passive devices, such as radar detectors, cameras, ultrasonic transmitters and detectors, and infrared detectors. U.S. Pat. No. 4,694,295, issued to Miller et al. in 1998, discloses a vehicle blind spot detector comprising sequentially operating dual sensors, in which an infrared light emitting diode (LED) transmits infrared light that is reflected off an object in the vehicle's blind spot and is detected by an infrared detector. Once the target vehicle is detected, a second sensor is activated after a preset delay. The second sensor is ultrasonic and determines the distance between the operator's vehicle and the target vehicle.

U.S. Pat. No. 4,872,051, issued to Dye in 1989, discloses a passive collision avoidance alarm system disposed to provide a continuous raster scan of the scene within a wide angle of the direction of travel of the vehicle.

U.S. Pat. No. 5,173,881, issued to Sindle in 1992, discloses a plurality of preferably ultrasonic distance-detector devices disposed around a vehicle's periphery and connected to a simulated vehicle display on the dashboard that provides a visual alert to the driver of the close approach of an external object to the vehicle.

U.S. Pat. No. 5,325,096, issued to Paskett in 1994, discloses a radar system for sensing the presence of obstacles in a vehicle's blind spot and generating a signal to the vehicle's operator. The system uses a radar transceiver that transmits a radio frequency signal directed at a blind spot of the vehicle. The signal is reflected off any obstacles that are present in that blind spot and Doppler shift in the received reflected frequency indicates that an object has moved into the blind spot.

U.S. Pat. No. 5,463,384, issued to Juds in 1995, discloses a collision avoidance system that uses LEDs to transmit a plurality of infrared beams and uses a photosensitive device to detect the reflected energy.

U.S. Pat. No. 5,574,426, issued to Shisgal et al. in 1996, discloses an electronic obstacle detection system for guiding and warning a motorist of obstacles in the detection spot while backing up. The system includes a pair of sensor clusters affixed to the rear of the vehicle, a pair of exterior visual indicators, and an audio-visual indicator located in the vehicle. The system determines distance to an obstacle by measuring the time lapse between the transmission of a signal and the receipt of its return signal, angle and the distance between the clusters.

U.S. Pat. No. 5,734,336, issued to Smithline in 1998, discloses a collision avoidance system that uses a plurality of acoustic piezoelectric transducers to determine the location of objects near the vehicle, a microprocessor to process information from the transducers and several displays to display the information to the vehicle's operator.

U.S. Pat. No. 5,929,786, issued to Schofield et al. in 1999, discloses a blind spot detector system, which may utilize infrared, optical, or ultrasonic technology to detect objects in the vehicle's blind spot. The transmitter and receiver are mounted in the side view mirrors and a display is provided in the side view mirrors along with a display mounted in the vehicle's rear view mirror.

U.S. Pat. No. 5,982,278, issued to Cuvelier in 1999, discloses a set of transmitting-receiver sensors arranged on a vehicle and facing the driving surface which continuously observe changes in the reflective properties of the observed areas. The invention utilizes an electronic unit controlling an on-board signaling system linked to an alarm system which warns the driver of road hazards and possible unsafe driving.

U.S. Pat. No. 6,184,782, issued to Oda et al. in 2001, describes a system utilizing an infrared sensor for detecting vehicles approaching the operator's vehicle from the rear. The system comprises an infrared detector for detecting the heat generated from the approaching vehicle, and optical components for focusing the heat towards the detector.

Another infrared sensing device for detecting the presence of an overtaking vehicle is disclosed by U.S. Pat. No. 6,388,566 issued to Perio et al. in 2002. The '566 patent comprises at least two infrared sensors, the signals from these sensors being analyzed so as to distinguish overtaking vehicles from that of other vehicles traveling in the opposite direction, as well as avoiding alarms due to electronic and electromagnetic noise.

Similarly, German Patent No. DE3943431, published in 1991, discloses an LED and infrared sensor mounted in a side view mirror. Besides detecting the reflected energy from the LED, the sensor responds to the heat being generated by the approaching vehicle's engine.

In addition, French Patent No. FR2698449, published in 1994, discloses the use of two sets of infrared LED and receiver pairs, which are set at the rear side panel of a vehicle and emit parallel waves perpendicular to the vehicle's motion. An alarm is generated when the first receiver receives a return signal before the second receiver which lies in front of the first.

Another blind spot detecting device comprising a passive infrared sensor is disclosed in W.I.P.O Patent No. WO 95/25322 published in 1995. The infrared sensor generates a signal in response to a heat-emitting object moving in its field of view. A bandpass filter passes signals having a frequency within a predetermined band characteristic of moving vehicles. An indicator displays the presence of an object upon detection of a signal in the predetermined band.

A limitation common to all the above inventions is the lack of a means to determine and indicate to the user a lack of system integrity. A malfunction of a blind spot detection device resulting in the failure to detect an object in the vehicle's blind spot may have serious consequences to the vehicle and to its operator.

None of the above inventions and patents, taken either singly or in combination, is seen to describe the instant invention as claimed. Thus a blind spot detection system solving the aforementioned problems is desired.

SUMMARY OF THE INVENTION

The blind spot detection system is adapted for mounting to the exterior of a vehicle to sense the presence of obstacles within a vehicle's "blind spot" and to generate a signal to the vehicle's operator indicating the presence of the object. The detector system includes a housing containing an operative circuit board, a side view mirror that has been adapted to receive the housing, at least one infrared LED, an infrared photodetector and demodulator, a microcontroller, a memory, program instruction code, and circuitry interconnecting the aforementioned elements. Under control of the microcontroller, the transmitted infrared power amplitude is linearly modulated, whereby the distance to an object can be determined by analyzing the point in time at which the reflected infrared light is detected by the infrared photodetector. Additionally, the infrared power is frequency modulated and the received signal is demodulated to screen out random light radiation that might incorrectly trigger the infrared detector. Upon application of power, the system enters an initialization phase in which the system is calibrated with respect to its position on the vehicle by linearly increasing the output power of the infrared transmitter until the rear quadrant of the vehicle is detected at a pre-determined output level which will be designated as the "Calibration Level". In operational mode, the output power of the infrared transmitter is continuously modulated between the "Calibration Level" and a pre-determined lower threshold designated the "System Integrity Level", whereby an object detected while the transmitted output power is greater than the "System Integrity Level" and less than the "Calibration Level" will cause a flashing red LED to be illuminated, signaling to the operator of the vehicle the presence of an object. Detection of an object at a transmitted power level at or below the "System Integrity Level", or failure to detect the rear quadrant of the vehicle at the "Calibration Level" will result in a steady red status indication that the detector system is non-functioning.

Accordingly, it is a principal object of the invention to provide a blind spot detector system that has an automatic built-in test capability that continuously monitors the calibration of the detector system.

It is another object of the invention to provide a blind spot detector system that can detect the approximate distance to an object.

Still another object of the invention is to provide a blind spot detector system which can be removably attached to vehicles and other objects.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a perspective view of an alternative embodiment of the blind spot detector system of the present invention adapted for attachment to a side view mirror.

FIG. 5 is an exploded perspective view of the blind spot detector system according to FIG. 4.

Similar reference characters denote corresponding features consistently throughout the attached drawings.

DETAILED DESCRIPTION OF THE PREFERRED EMBODIMENTS

Figure 1:
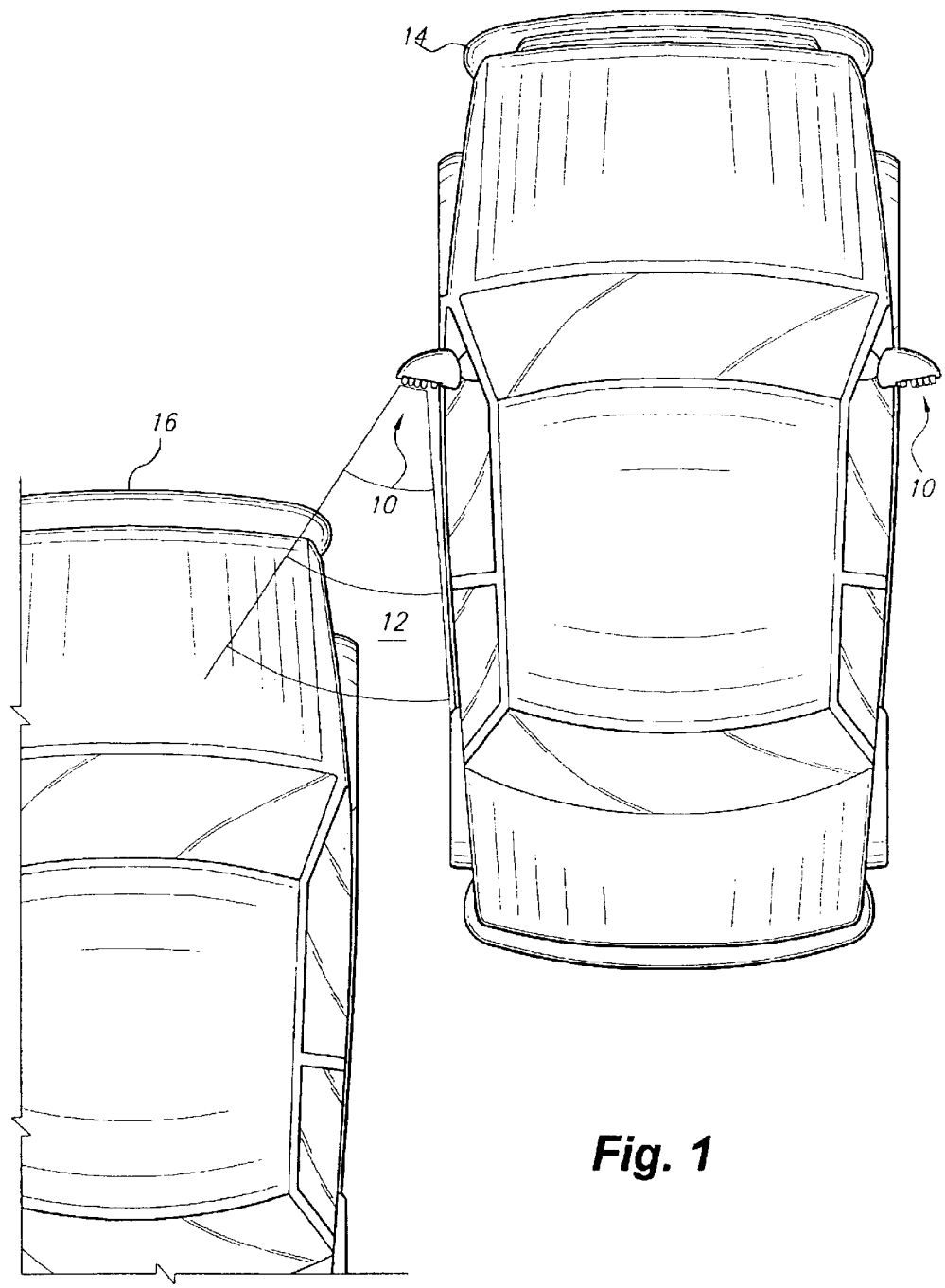
FIG. 1 is an environmental, perspective view of a blind spot detector system according to the present invention.

As shown in FIG. 1, a blind spot detector system 10, mounted on the exterior of a vehicle 14, utilizes light emitting diodes (LEDs) to reflect infrared light from an object 16 in the vehicle's blind spot 12. The reflected light is then detected and a visual indication is presented to the operator of the vehicle 14. The LEDs and infrared detector are frequency modulated at approximately 40 Khz to screen out unwanted light energy.

Figure 2:
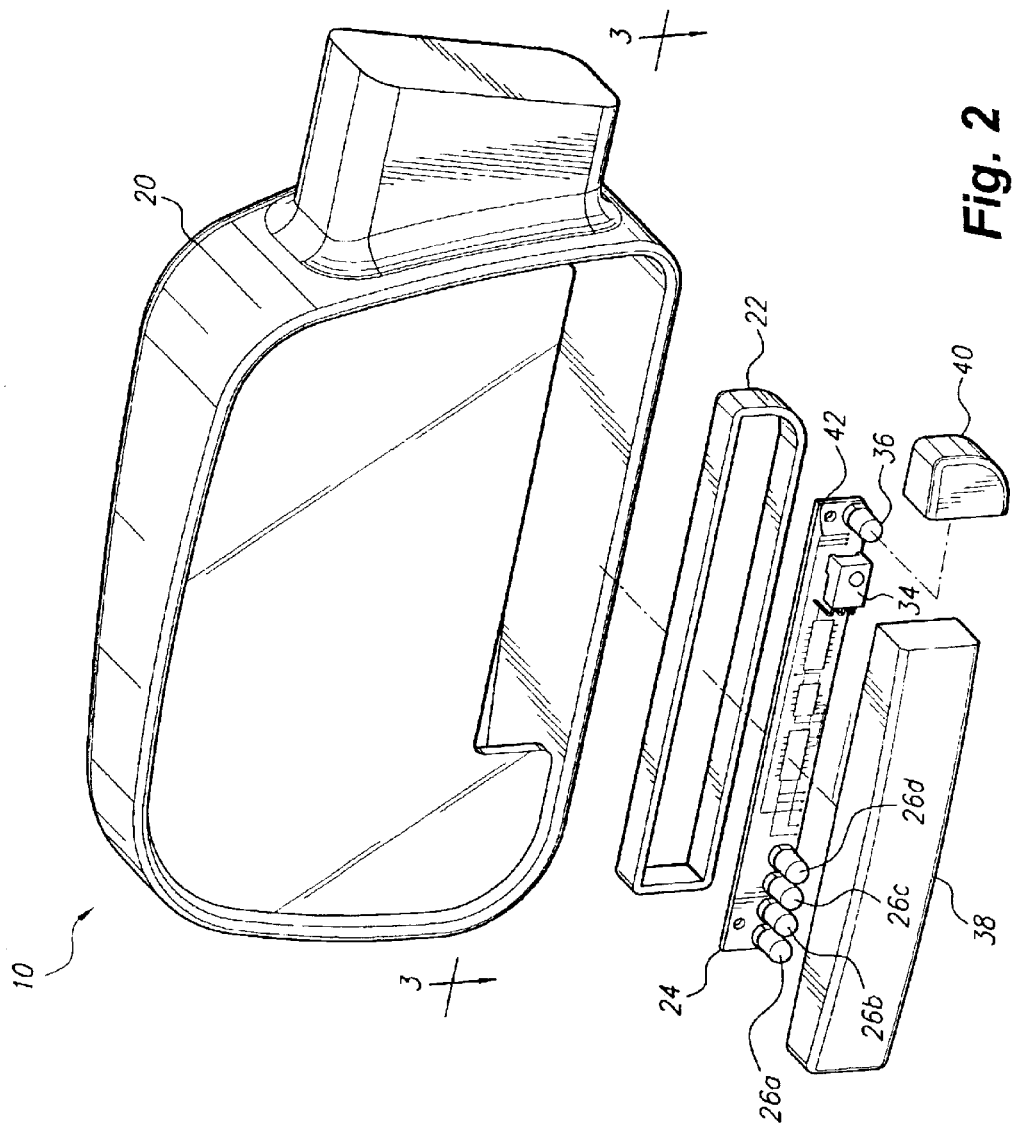
FIG. 2 is an exploded perspective view of the blind spot detector system according to FIG. 1.
Figure 3:
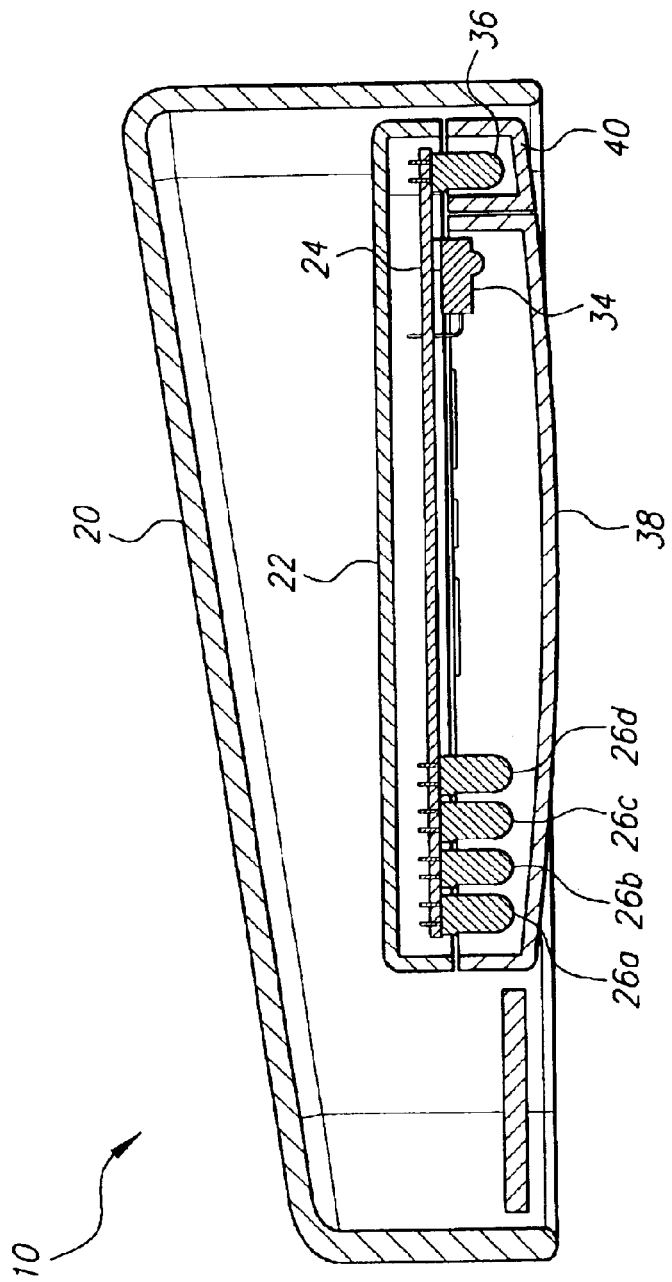
FIG. 3 is a section view drawn along lines 3—3 of FIG. 2.
Figure 6:
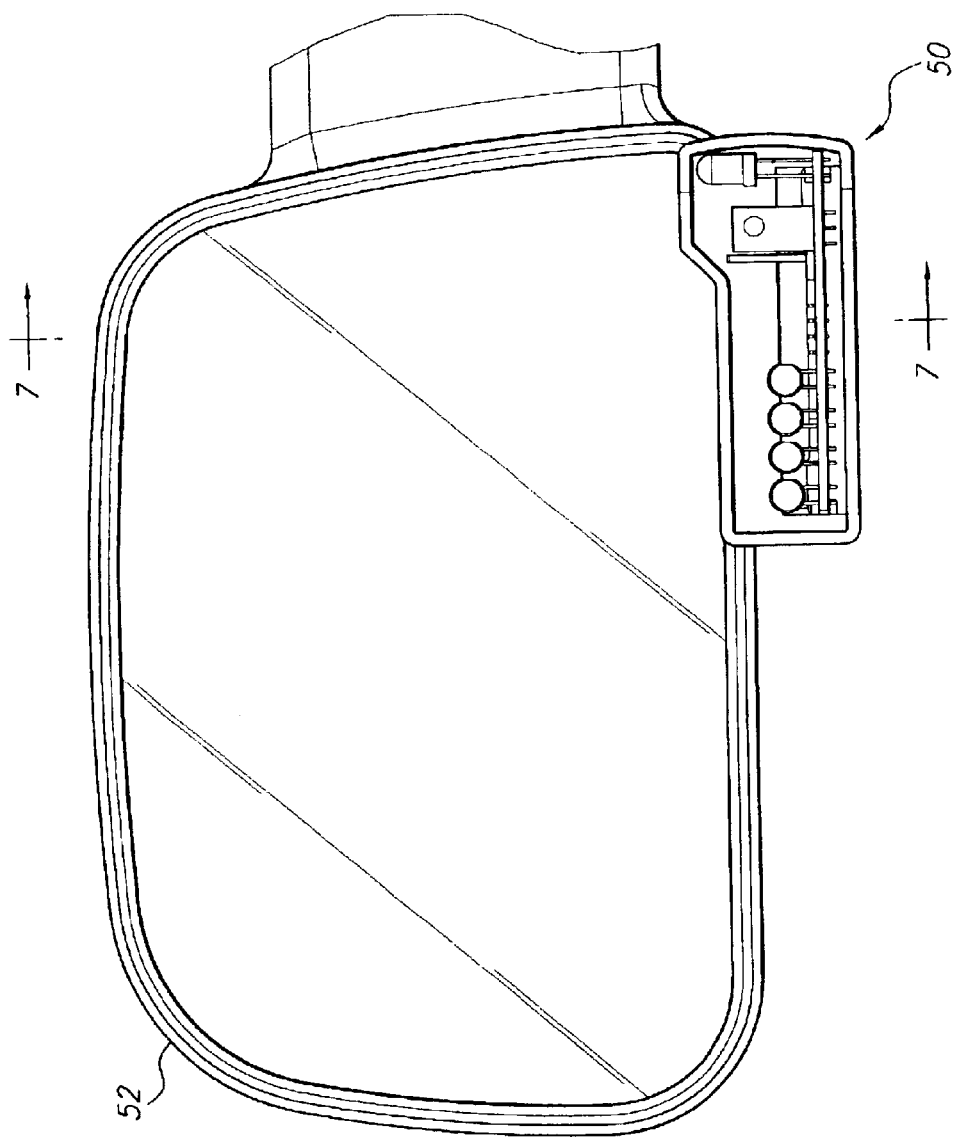
FIG. 6 is a front view of the blind spot detector system according to FIG. 4 with the front cover removed.
Figure 7:
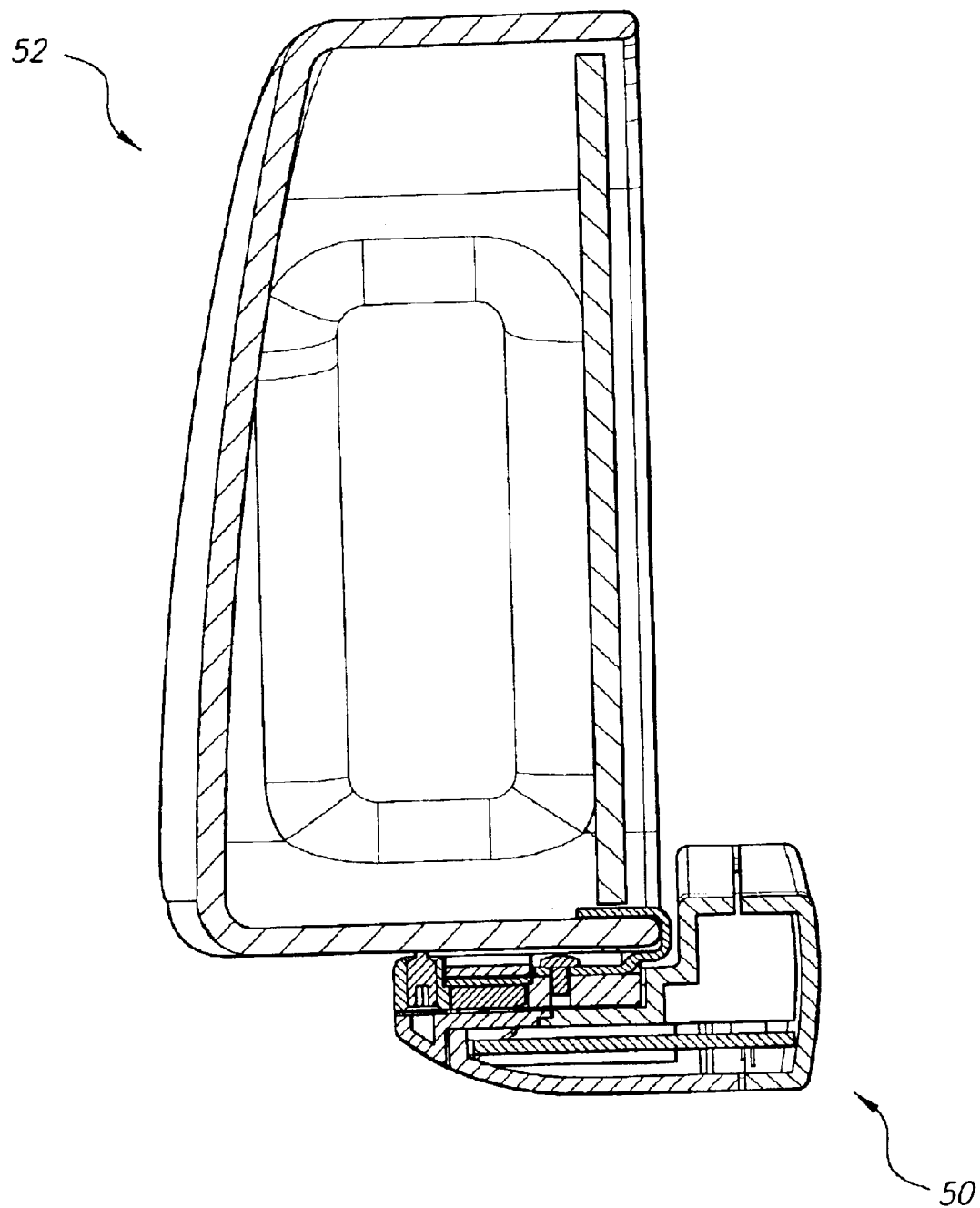
FIG. 7 is a section view drawn along lines 7—7 of FIG. 6.

As shown in FIGS. 2 and 3, the detector system 10 comprises a side view mirror 20 adapted to receive a housing 22 containing circuitry 42 disposed on a circuit board 24. Mounted on the circuit board is at least one infrared LED, 26a–d, an infrared photo detector and demodulator 34, and a bi-color indicator LED 36 that illuminates green when the detector system 10 is active and operational, solid red when the detector system 10 is out of calibration, and flashes red when the detector system 10 has sensed an object 16 within the vehicle's blind spot 12. Although the present embodiment is shown having four infrared LEDs 26a, 26b, 26c and 26d, the detector system 10 is not limited to a specific number of LEDs, and other embodiments with more or fewer LEDs are envisioned. However, it will be noted that by using four infrared light emitting diodes 26a–26d, the IR beam emitted by the system 10 has four times the peak intensity of a single IR transmitter, thereby permitting greater discrimination in the calibration function described below. Covering the components on the circuit board 24 are two transparent plastic covers 38 and 40, which permit the transmission and reception of infrared light.

FIGS. 4–7 illustrate an alternative embodiment of the present invention in which a portable portion of the detector 50 is slidably received by a shoe connector 68 clipped onto the frame of an external side view mirror 52 by means of a steel clip 66. The shoe connector 68 makes electrical contact with an insert-molded plate 56 on the detector housing 54. Four wires molded into the detector housing 54, make contact with a terminal strip 64 on the shoe connector 68 and contact the detector's printed circuit board 58 on the inside of the detector housing 54. A cable, not shown, supplies power to the shoe connector 68 from a voltage source within the vehicle 14. Three setscrews 70a–c allow for pitch and level adjustments while giving the detector 50 a firm attachment to the vehicle 14. A further embodiment of the present invention provides for a nickel cadmium battery disposed within housing 54 to preclude an external cable connecting the detector to a voltage source within the vehicle. It will be seen that the embodiment of FIGS. 1–3 is built-in or made integral with the side view mirror for original equipment manufacture, while the embodiment of FIGS. 4–7 is a retrofit installation for aftermarket attachment to an existing side view mirror.

Figure 11:
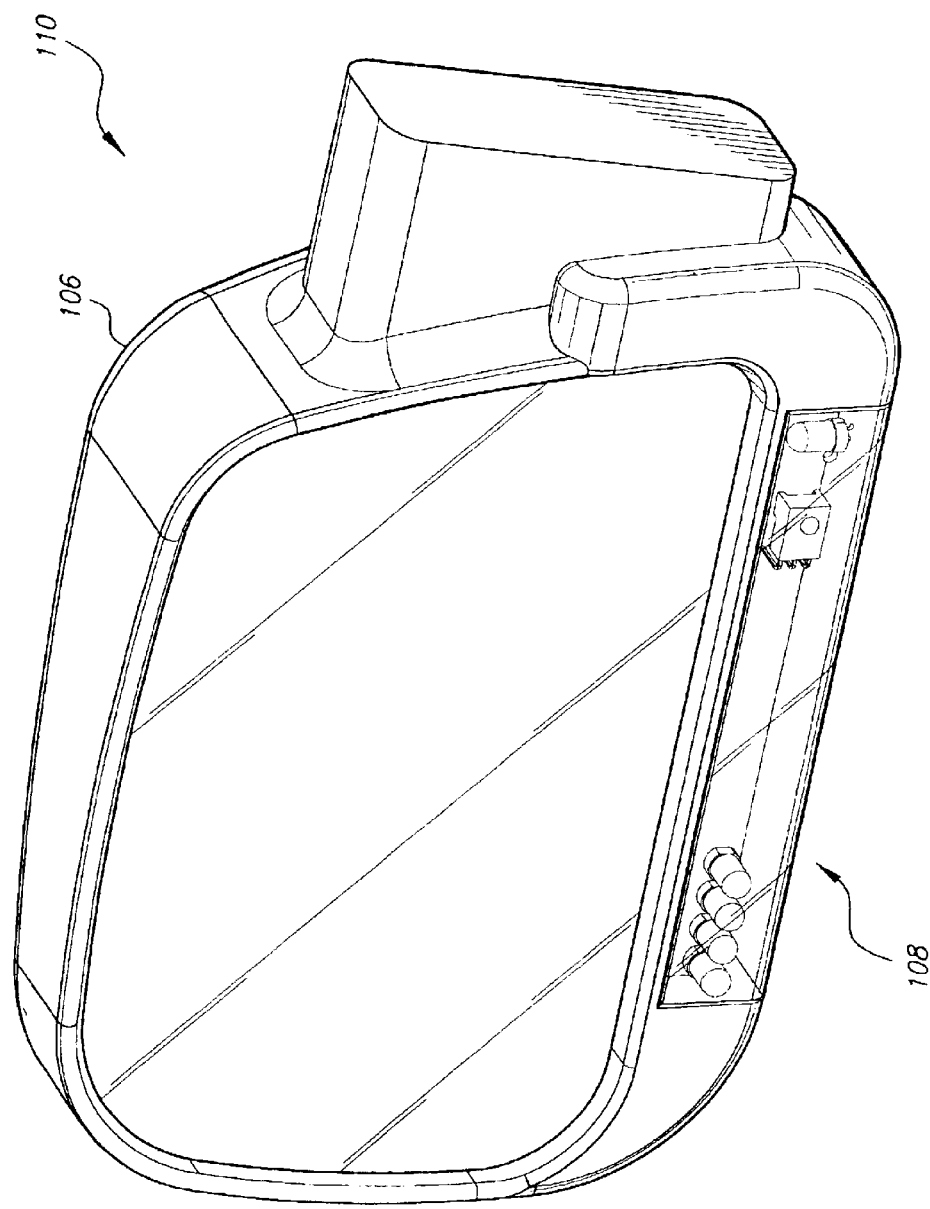
FIG. 11 is a third embodiment of the present invention integrated within the bottom of a side-view mirror.

FIG. 11 illustrates a further embodiment of the blind-spot detector system 110, wherein the housing 108 is integrated into the bottom of a full size mirror assembly 106.

Figure 10:
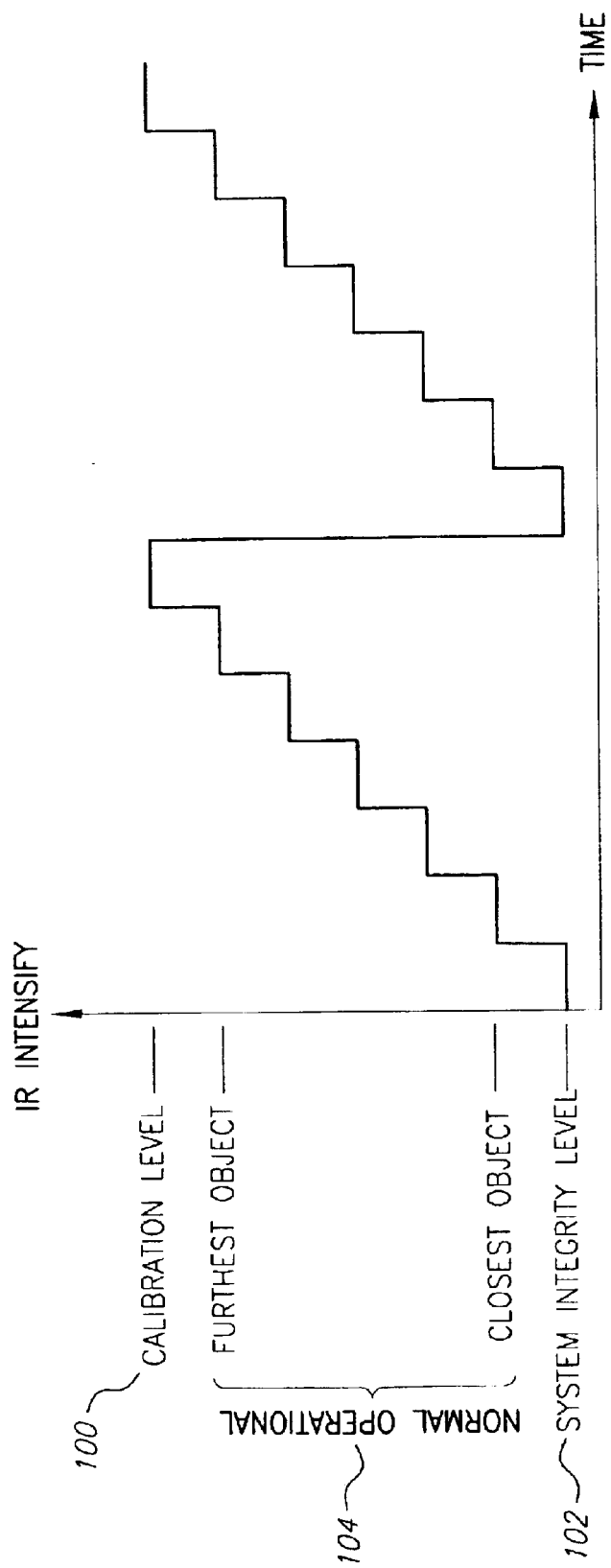
FIG. 10 is a graph of the infrared power output of the present invention as a function of time.

When power is first applied to the detector system 10, such as when the vehicle's ignition is turned on, the detector system 10 enters a calibration phase during which the status indicator 36 is illuminated red. As shown in FIG. 10, the output power of the infrared LEDs 26a–26d is increased in linear steps from a minimum "System Integrity Level" 102, to a predetermined "Calibration Level" 100. This linear step function of the output power of the LEDs is repeated every 100 ms. The detector system 10 is properly calibrated once the detector 10 senses the rear quadrant of the vehicle 14 when the combined output power of the LEDs is equal to the "Calibration Level" 100. If the detector system 10 senses the vehicle at a power level less than the "Calibration Level" 100, or completely fails to detect the vehicle, the detector system 10 will remain in calibration mode with the status indicator 36 illuminated red. The detector system 10 enters operational mode and the status indicator 36 changes from red to green once the detector system 10 is physically adjusted to meet the aforementioned calibration requirements. Hence, the user repositions the side view mirror until the indicator LED is illuminated green, signifying that the system is properly positioned to detect an object in the blind area not directly observable in the mirror. If the indicator light remains a solid or nonblinking red, this signifies a malfunction in the detection system, which may occur, e.g., when the IR transmitters or detector are obstructed by snow or ice, or when the beam is not properly aimed at the blind area.

As further shown in FIG. 10, the range of transmitted infrared power between the "System Integrity Level" 102 and the "Calibration Level" 100 is designated the "Normal Operation Level" range 104. Once the detector system 10 is in operation mode, an object 16 detected when the transmitted power is in the "Normal Operation Level" 104 will be determined to be a valid "contact". The closer the object, the lower the required infrared power needed to detect it. Status indicator 36 will continue to flash red while an object 16 remains within the "blind spot" 12. At maximum power, an object 16 can be detected at approximately 15 feet from the vehicle 14 within an angular radius of approximately 60° from the vehicle.

The detector system 10 undergoes continuous system integrity testing while in operational mode. Infrared radiation transmitted in accordance with the linear step function shown in FIG. 10 will detect the presence of the rear quadrant of the attached vehicle at the "Calibration Level" output power, and will signal to the operator proper functioning of the detector system 10.

Figure 8:
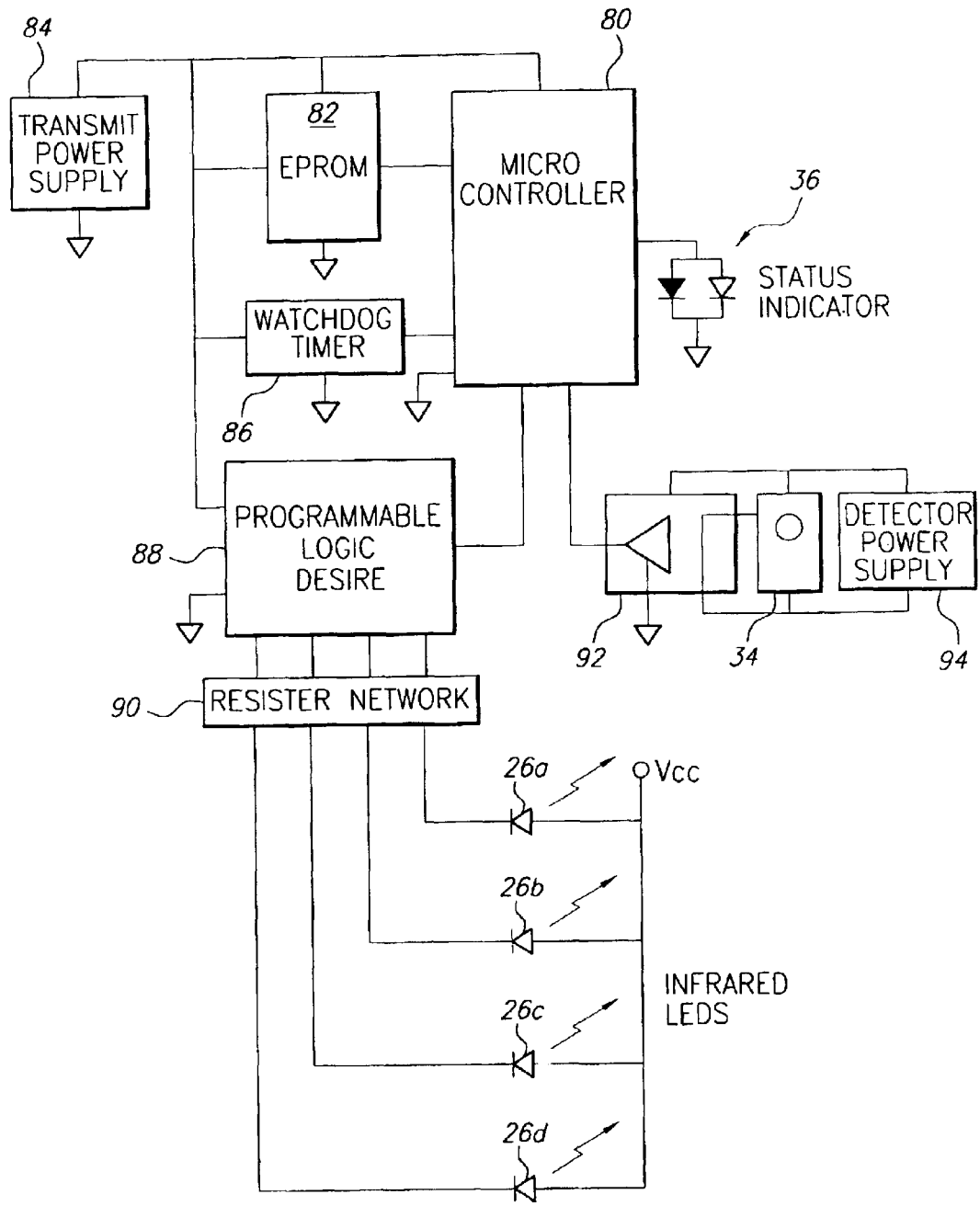
FIG. 8 is a functional block diagram of the blind spot detector system of the present invention.

As shown in the functional block diagram of FIG. 8, one embodiment of the present invention has a microcontroller 80 with executable program code stored in a memory device 82. The microcontroller 80 controls the timing and output power level of infrared LEDs 26a–26d through custom logic 88 and resistor network 90. A watchdog timer 86 monitors the operation of the microcontroller 80 as it executes the stored program code and resets the microcontroller 80 in the event the microcontroller 80 fails to reset the watchdog timer 86 within a predetermined period of time.

As further shown in FIG. 8, infrared energy is detected and demodulated by infrared photodetector 34, the output of which is monitored by the microcontroller 80. In order to prevent electronic interference from the transmit portion of the circuit from affecting the infrared photodetector and demodulator 34, the transmit portion and the infrared receiver portion derive their power from separate power sources, 84 and 94 respectively. To further decouple the transmit logic from the receiver logic, the output of the photodetector and demodulator 34 is optically isolated from the input to the microcontroller 80 by means of an optical isolator 92.

As known to those skilled in the art, there are many different ways the functional block diagram of FIG. 8 may be implemented, and the functional schematic shown in FIGS. 9A–9D is but one embodiment of the present invention.

Figure 9A:
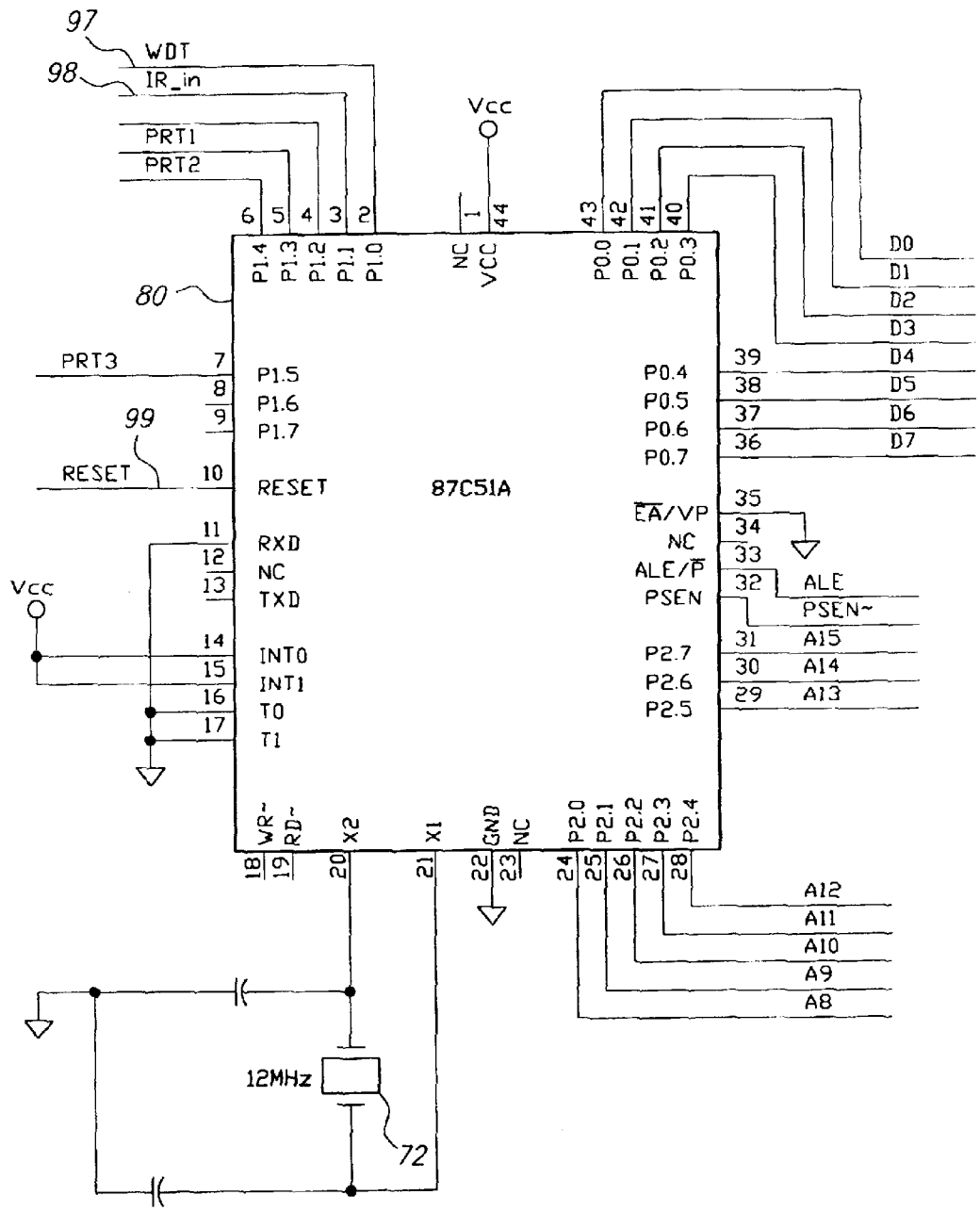
FIGS. 9A, 9B, 9C and 9D represent a functional schematic of the blind spot detector system of the present invention.
Figure 9B:
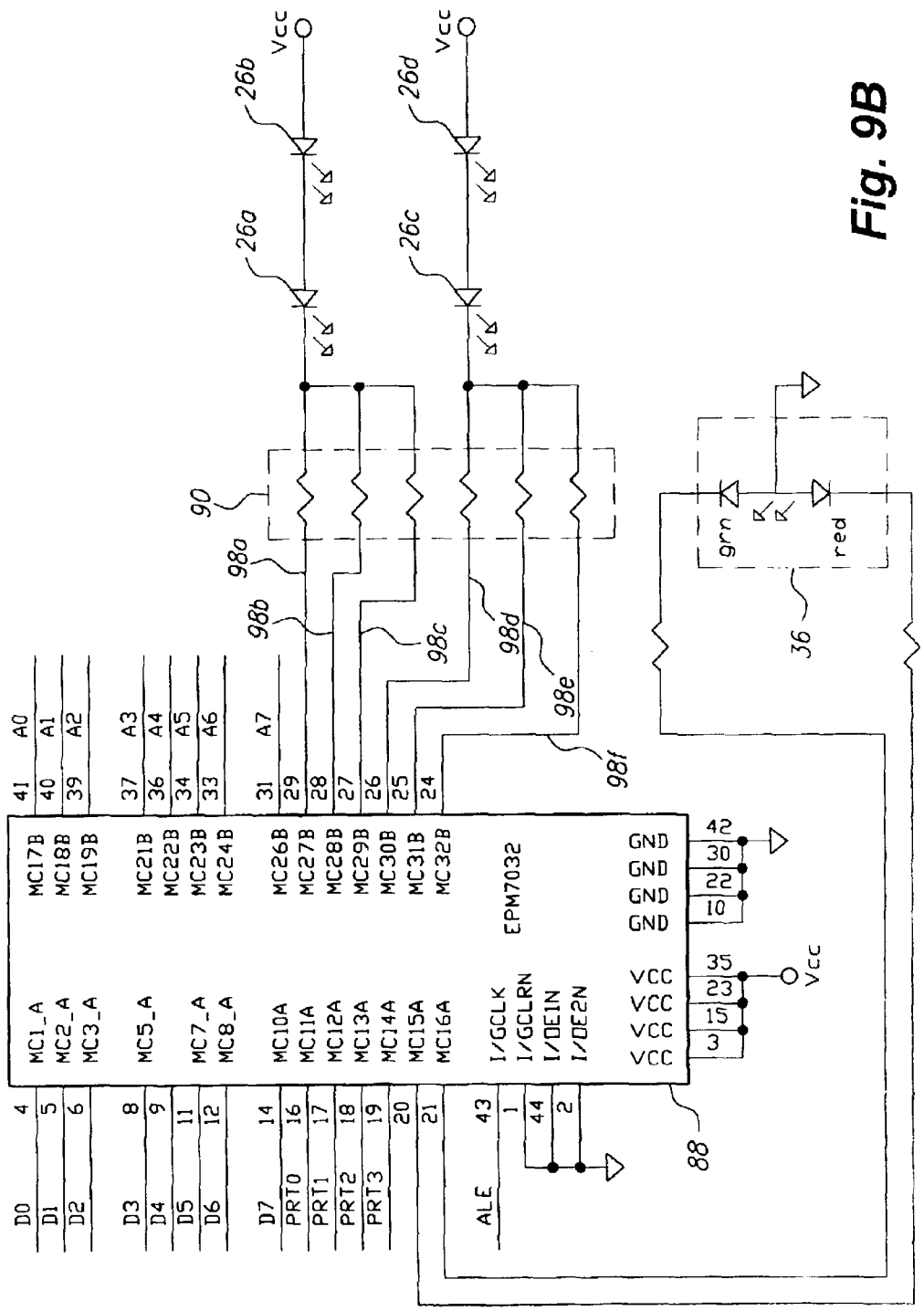
Figure 9C:
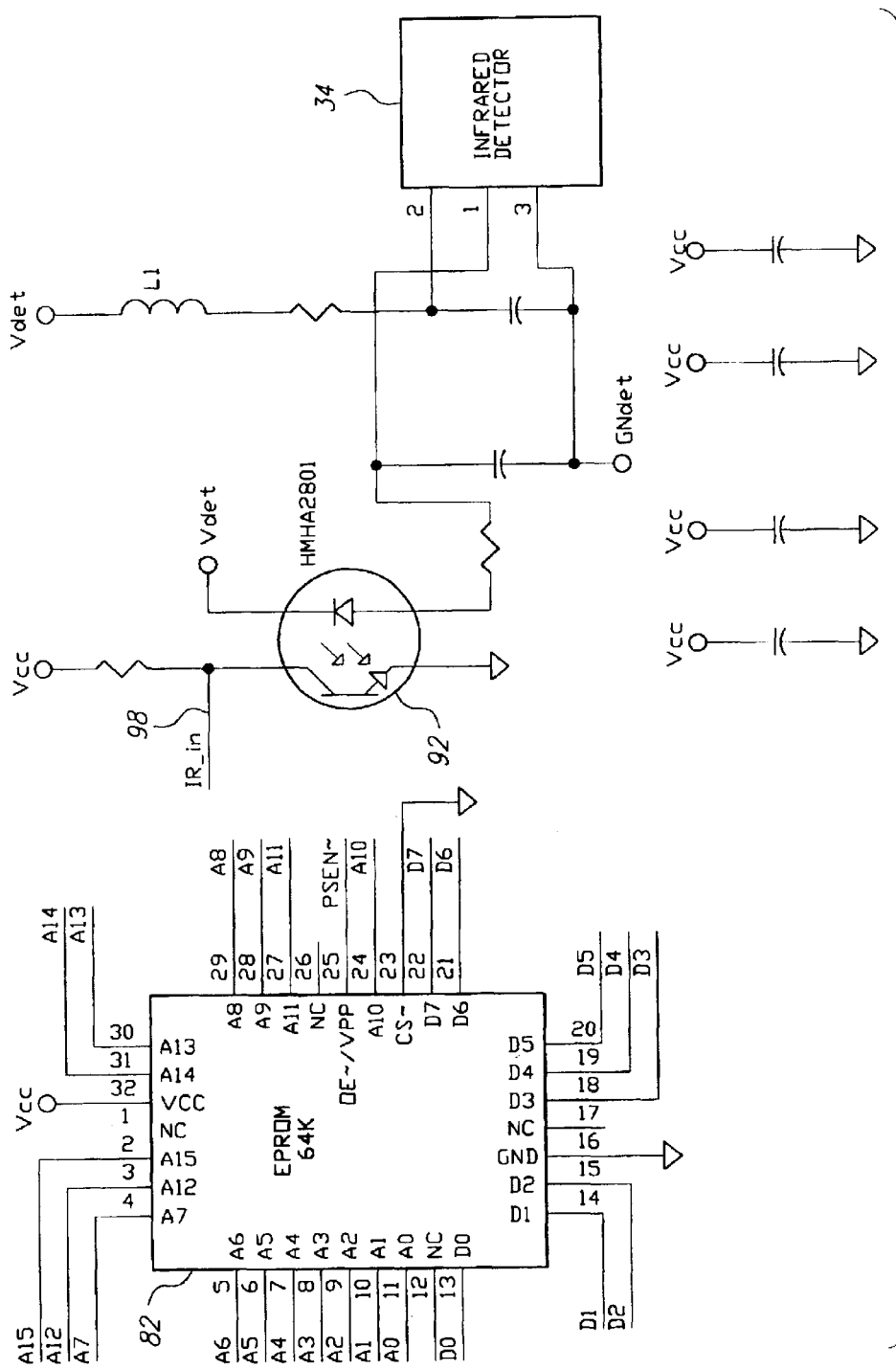

As shown in FIG. 9A, a microcontroller 80 derives it clocking from a 12 MHz. crystal oscillator 72 and executes program code stored in an electrically programmable read-only memory (EPROM) 82 shown in FIG. 9C. Referring to FIG. 9B, a custom Complex Programmable Logic Device (CPLD) 88 is in electrical communication with the microcontroller 80 and generates signals 78a–78f, which ground LEDs 26a–d through resistor network 90. The values of the individual resistors in the resistor network 90 are different, and the CPLD 88 is programmed to apply an appropriate bias to the LED transmitters 26a–26d at the proper time to create the calibrated intensity levels shown in FIG. 10. The CPLD 88 also sends the timing signal of the staircase or sawtooth variation in power intensity to the microcontroller 80. In addition to controlling the output power of LEDs 26a–26d, the CPLD 88 frequency modulates the output power at approximately 40 Khz to minimize the effect of stray infrared energy on the operation of the detector 10.

Infrared light reflected from an object within the vehicle's blind spot is detected and demodulated by infrared detector 34. The detector 34 is a standard 40 kHz IR detector, such as a Sharp GP1UD26XK Series or equivalent IR detector, of the type frequently employed in remote control receivers. The output of the detector and demodulator 34 is optically connected to an input of the microcontroller 80 by means of optical isolator 92. Under control of the program code stored in the memory 82, the microcontroller 80 illuminates the status LED 36 shown in FIG. 9B when the reflected beam is at the frequency applied by the CPLD 88 in accordance with the aforementioned functional description, the indicator LED showing either flashing red or steady red depending upon the point in the staircase power intensity waveform that the reflected IR beam is detected. Status indicator LED 36 is a red and green bi-color LED with a common anode which illuminates green when the detector is operational, flashes red when the detector system 10 has detected an object within the detector's blind spot, and is a continuous red indication during initialization and when the detector system 10 has failed system integrity testing.

Figure 9D:
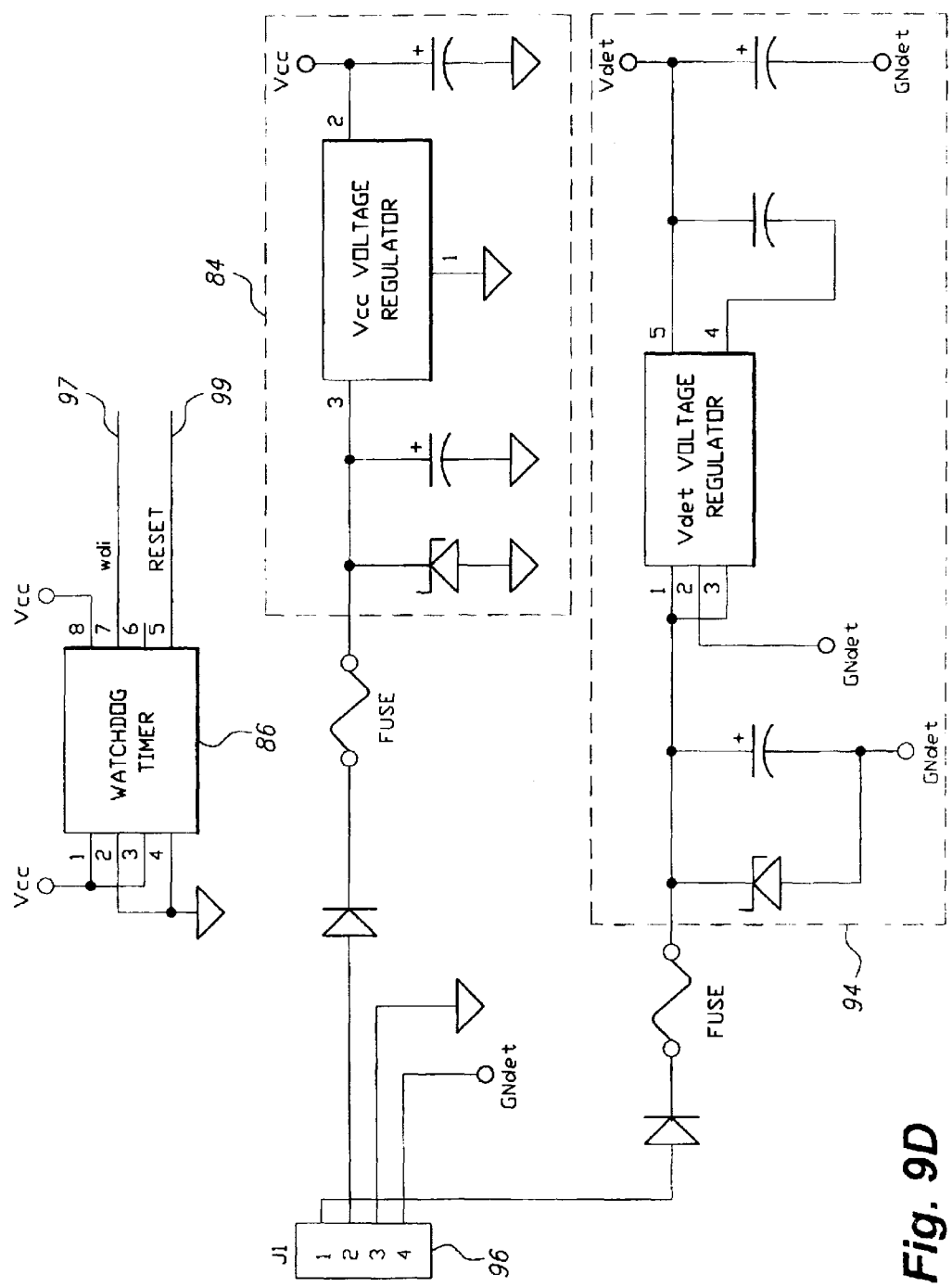

The watchdog timer 86, shown in FIG. 9D, is similar to a retriggerable monostable multivibrator, or "one-shot", and will generate a "reset" signal 99 which will reset the microcontroller 80 if the timer does not receive a "keep-alive" signal 97 from the microcontroller within a predetermined period of time. FIG. 9D also illustrates power supply circuits 84 and 94, which supply power to the infrared transmitter circuitry and the infrared detector circuitry respectively. Power is impressed upon the circuit by means of a connector 96 mounted on the circuit board 24. A cable, not shown, in electrical communication with a voltage source within the vehicle 14, supplies sufficient current at approximately 12 volts DC to operate the detector 10.

Advantageously, the use of programmable integrated circuits permits the blind area detection system 10 to be housed as an integral unit in a small, compact housing mounted in or on the vehicle's side view mirror.

It is to be understood that the present invention is not limited to the embodiments described above, but encompasses any and all embodiments within the scope of the following claims.

We claim:

1. A blind spot detector system for detecting an object in a blind spot outside of an effective viewing spot of a side view mirror mounted on a vehicle, comprising:
    a detector housing adapted for attachment to the side view mirror;
    transmitter means disposed in said detector housing for transmitting an infrared beam into the blind spot;
    detector means disposed in said detector housing for detecting reflection of the infrared beam from striking the object in the blind spot;
    indicator means disposed in said detector housing for indicating when the object is in the blind spot;
    power intensity calibration means disposed in said detector housing for calibrating the power intensity of the transmitted infrared beam and emitting the beam with a staircase waveform of power intensity; and
    frequency modulating means disposed in said detector housing for modulating the frequency of the transmitted infrared beam.

2. The blind spot detector system according to claim 1, wherein said indicator means comprises a multi-colored light emitting diode.

3. The blind spot detector system according to claim 1, further comprising a vehicle side view mirror having a mirror housing, said detector housing being made in one piece with said mirror housing.

4. The blind spot detector system according to claim 1, further comprising a vehicle side view mirror having a mirror housing, wherein said detector housing further comprises means for attaching said detector housing to said mirror housing.

5. The blind spot detector system according to claim 1, wherein said transmitter means comprises at least one infrared light emitting diode.

6. The blind spot detector system according to claim 1, wherein said transmitter means comprises a plurality of infrared light emitting diodes.

7. The blind spot detector system according to claim 1, wherein said detector means comprises an infrared photo detector and a frequency demodulator.

8. The blind spot detector system according to claim 1, wherein said power intensity calibration means comprises:
    a resistor network electrically connected to said transmitter means; and
    a complex programmable logic device electrically connected to said resistor network, said logic device being programmed to change a bias applied to the transmitter means by said resistor network at timed intervals in order to produce a transmitted waveform with calibrated step increases in intensity.

9. The blind spot detector system according to claim 8, wherein:
    said detector means further includes:
        a microcontroller electrically connected to said logic device; and
        an erasable programmable read only memory device electrically connected to said microcontroller;
    said step waveform includes a high intensity level, a low intensity level, and at least one intermediate intensity level between the high intensity level and the low intensity level; and
    said microcontroller and said erasable programmable read only memory are programmed to send:
        a first indicating signal to the indicator means when a reflected infrared beam is not detected during the high intensity level and intermediate intensity level portions of successive waveform cycles,
        a second indicating signal to the indicator means when a reflected infrared beam is detected during the intermediate and high intensity levels of successive waveform cycles; and
        a third indicating signal to the indicator means when a reflected infrared beam is detected only during the high intensity level of successive waveform cycles.

10. A blind spot detection system, comprising:
    an array of infrared light emitting diodes;
    a driver circuit electrically connected to said array of infrared light emitting diodes, the driver circuit being configured to drive said diodes to produce an emitted infrared beam modulated in frequency and modulated in power intensity between a highest power intensity and a lowest power intensity;
    an infrared detector including a frequency demodulator configured to detect the infrared beam;
    an indicator display device;
    a microcontroller electrically connected to said driver circuit, to said infrared detector, and to said indicator display device, the microcontroller being programmed to display:
        a first state when a reflected infrared beam is detected only during the highest power intensity of the emitted infrared beam;
        a second state when a reflected infrared beam is detected both during the highest power intensity of the emitted infrared beam and during power intensities intermediate the highest and lowest power intensities; and
        a third state when a reflected beam is not detected during the highest power intensity of the emitted infrared beam; and
    wherein the system is adapted for mounting to a vehicle so that the first state occurs when the emitted infrared beam is directed to a blind spot, and the second state occurs when an object is detected in the blind spot.

11. The blind spot detector system according to claim 10, further comprising a detector housing adapted for mounting to a side view mirror, said infrared light emitting diodes, said driver circuit, said infrared detector, said indicator display device, and said microcontroller being disposed within said detector housing.

12. The blind spot detector system according to claim 11, wherein said detector housing further comprises means for removably attaching the detector housing to the side view mirror.

13. The blind spot detector system according to claim 10, further comprising:

a side view mirror having a mirror housing; and a detector housing made integral with said mirror housing, said infrared light emitting diodes, said driver circuit, said infrared detector, said indicator display device, and said microcontroller being disposed within said detector housing.

14. The blind spot detector system according to claim 10, wherein said driver circuit comprises:

a resistor network electrically connected to said infrared light emitting diodes; and a complex programmable logic device electrically connected to said resistor network.

15. The blind spot detector system according to claim 10, further comprising an optical isolator connected between said infrared detector and said microcontroller.

* * * * *